(12) United States Patent
Oishi et al.

(10) Patent No.: US 7,443,493 B2
(45) Date of Patent: Oct. 28, 2008

(54) TRANSFER CHARACTERISTIC CALCULATION APPARATUS, TRANSFER CHARACTERISTIC CALCULATION METHOD, AND EXPOSURE APPARATUS

(75) Inventors: Satoru Oishi, Utsunomiya (JP); Hideki Ina, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 11/688,408

(22) Filed: Mar. 20, 2007

(65) Prior Publication Data

US 2007/0237253 A1 Oct. 11, 2007

(30) Foreign Application Priority Data

Mar. 30, 2006 (JP) .............................. 2006-095854

(51) Int. Cl.
*G01B 9/00* (2006.01)
(52) U.S. Cl. ..................... 356/124; 356/401; 702/150
(58) Field of Classification Search ......... 356/614–624, 356/124–127, 401–402; 702/150; 250/492.22, 250/491.1
See application file for complete search history.

(56) References Cited

U.S. PATENT DOCUMENTS

| | | | |
|---|---|---|---|
| 6,999,893 B2 | 2/2006 | Matsumoto et al. | |
| 7,049,608 B2* | 5/2006 | Yamaguchi et al. | ..... 250/492.22 |
| 7,103,497 B2 | 9/2006 | Matsumoto et al. | |
| 2001/0024278 A1* | 9/2001 | Yoshida | ...................... 356/401 |
| 2006/0241894 A1 | 10/2006 | Matsumoto et al. | |

FOREIGN PATENT DOCUMENTS

| | | |
|---|---|---|
| JP | 3-6467 | 1/1991 |
| JP | 6-151274 | 5/1994 |
| JP | 8-094315 | 4/1996 |
| JP | 2004-117030 | 4/2004 |

* cited by examiner

*Primary Examiner*—Hoa Q Pham
(74) *Attorney, Agent, or Firm*—Fitzpatrick, Cella, Harper & Scinto

(57) ABSTRACT

A transfer characteristic calculation apparatus for calculating a transfer characteristic of an imaging optical system includes a light source, a generation unit which generates a second signal by converting a first signal obtained by stretching an impulse signal on a space axis into a positive value using a light from the light source, a sensor which obtains an image that is output from the imaging optical system as an output signal when a light intensity distribution is inputted as the second signal, and a calculation unit which calculates the transfer characteristic of the imaging optical system by convolution of a third signal with the forth signal that is obtained by canceling a bias component of the output signal obtained by the sensor, the third being an impulse signal upon convolution with the first signal.

7 Claims, 16 Drawing Sheets

FIG. 8A
FIG. 8B
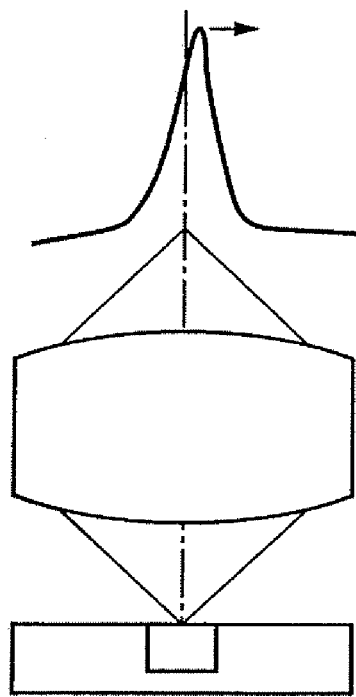
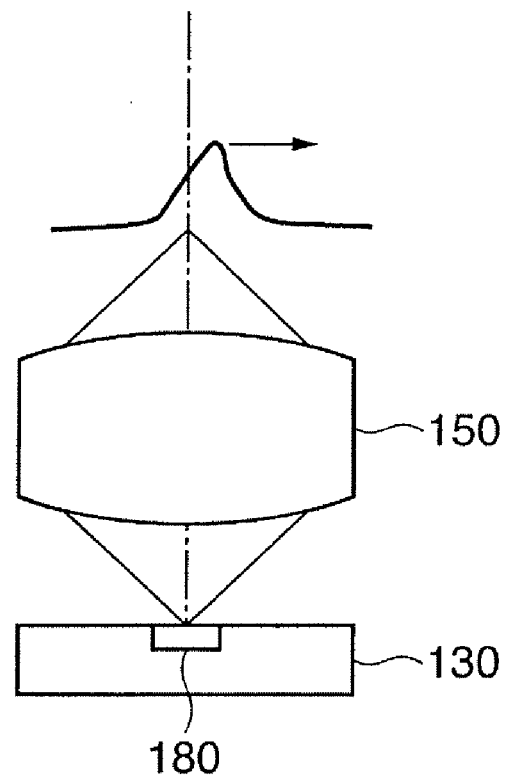

f(x)

f'(x) (= f(x)+α)

FIRST AMOUNT α

TRANSFER CHARACTERISTIC CALCULATION APPARATUS, TRANSFER CHARACTERISTIC CALCULATION METHOD, AND EXPOSURE APPARATUS

BACKGROUND OF THE INVENTION

1. Field of the Invention

The present invention relates to a method and an apparatus for calculating the transfer characteristic of an imaging optical system and an exposure apparatus using the calculated transfer characteristic.

2. Description of the Related Art

Assume that an imaging optical system is linear and shift-invariant, as shown in FIG. 15. Let f(x) be the input signal to the optical system, h(x) be the transfer characteristic of the optical system, and g(x) be the output signal after imaging in the optical system. Then, g(x) is generally given by:

$$g(x) = f(x) * h(x) \quad (1)$$
$$= \int_{-\infty}^{\infty} h(\tau) \cdot f(x-\tau) d\tau$$

As indicated by equation (1), g(x) is expressed by a convolution of f(x) and h(x). If the transfer characteristic is known, so-called image reconstruction is prevalently done, in which the input signal is reconstructed from the output signal by using an inverse filter or Wiener filter. To obtain the transfer characteristic, a method of directly obtaining an impulse response by inputting an impulse signal (delta function) to the system as an input signal is generally used.

Along with recent performance improvement and cost reduction of electronic devices, a semiconductor exposure apparatus is required to accurately and to efficiently manufacture semiconductor devices to be incorporated in the electronic devices. An exposure apparatus for forming a semiconductor circuit pattern by exposure is also required to perform accurate and efficient manufacturing. An exposure apparatus for producing semiconductor devices transfers a circuit pattern formed on a reticle or mask (to be referred to as a "reticle" hereinafter) to a wafer or glass plate (to be referred to as a "wafer" hereinafter) with a photosensitive material applied. Generally, to accurately form a circuit pattern by exposure, it is important to accurately align a reticle relative to a wafer.

In a conventional alignment method, alignment marks are exposed and transferred onto a wafer simultaneously with exposure/transfer of a circuit pattern formed on a reticle. An alignment detection optical system detects the positions of a plurality of preset alignment marks from all shots of the alignment marks so that position measurement is sequentially performed. The position measurement result is statistically processed to calculate the arrangement of all shots. Based on the calculation result, the wafer is aligned relative to the reticle.

The alignment marks serve as an index to accurately align the reticle and wafer. The alignment marks are also required to be precise along with size reduction of circuit patterns. In recent years, semiconductor manufacturing technologies such as CMP (Chemical Mechanical Polishing) have been introduced. Accordingly, errors (WIS: Wafer Induced Shift) occur due to the wafer process, including a variation in alignment mark shape between wafers or shots, resulting in degradation in alignment accuracy.

Japanese Patent Laid-Open No. 2004-117030 discloses a technique of correcting WIS by offset correction. "Offset correction" is a method of calculating an offset amount, i.e., a shift amount between the proper position (true value) of an alignment mark and an alignment mark position actually detected by a detection system and executing correction based on the offset amount.

Japanese Patent Laid-Open Nos. 6-151274 and 8-94315 disclose techniques related to a position detection method.

However, such an offset amount is generated by factors other than the error (WIS) caused by the wafer process as well. For example, an error (TIS: Tool Induced Shift) caused by the exposure apparatus (alignment optical system) or an error (TIS-WIS Interaction) caused by interaction between TIS and WIS may also degrade the alignment accuracy. WIS includes an alignment mark step offset, asymmetry, and resist application variation. TIS includes coma or spherical aberration of an alignment optical system.

The NA of a recent alignment optical system is high, though it cannot completely eliminate TIS. For this reason, if WIS is present due to the TIS-WIS interaction (e.g., a low step mark), the offset amount increases and makes it impossible to accurately detect the position of an alignment mark. Referring to FIGS. 5A and 8B, even in the same optical system, the offset amount in an alignment mark with a low step, as shown in FIG. 8B is larger than that in an alignment mark with a normal step, as shown in FIG. 8A because of the existence of TIS.

The above-described transfer characteristic h(x) includes the error (TIS) caused by the apparatus. If it is possible to calculate the transfer characteristic and to reconstruct the input signal from the output signal by using an inverse filter or Wiener filter, the influence of TIS in the reconstructed input signal is minimal. Hence, the offset amount by the TIS-WIS interaction is expected to be small.

The challenge is therefore to accurately calculate the transfer characteristic of the optical system. In the general method of directly measuring an impulse, however, it is necessary to form the intensity distribution of a δ function at the observation position. It is actually difficult to form the distribution (impulse width) of a δ function. Hence, there is a limit to the distribution width that can be formed, and an error is generated. The δ function preferably has a distribution which is as narrow as possible. However, if the distribution is too narrow, the energy becomes low, resulting in a poor S/N ratio. This also generates errors.

SUMMARY OF THE INVENTION

The present invention has been made in consideration of the above-described problems, and has as its object to improve the calculation accuracy of the transfer characteristic of an imaging optical system.

According to the first aspect of the present invention, there is provided a transfer characteristic calculation apparatus, for calculating a transfer characteristic of an imaging optical system, comprising a light source, a generation unit which generates a second signal by converting a first signal obtained by stretching an impulse signal on a space axis into a positive value using light from the light source, a sensor which obtains an image that is output from the imaging optical system as an output signal when a light intensity distribution is inputted as the second signal, and a calculation unit which calculates the transfer characteristic of the imaging optical system by convolution of a third signal with a fourth signal that is obtained by canceling a bias component of the output signal obtained by the sensor, the third signal being an impulse signal upon convolution with the first signal.

According to the second aspect of the present invention, there is provided an exposure apparatus, which exposes a substrate while controlling a position of a movable substrate stage in accordance with a position of a mark formed on the substrate held on the substrate stage, comprising an imaging optical system which obtains the mark as an input signal and outputs an image of the mark as an output signal, the above-described transfer characteristic calculation apparatus which calculates a transfer characteristic of the imaging optical system, a reconstruction unit which reconstructs the input signal based on information of the output signal and the transfer characteristic calculated by the transfer characteristic calculation apparatus, and a detection unit which detects the position of the mark based on the input signal reconstructed by the reconstruction unit.

According to the third aspect of the present invention, there is provided a device manufacturing method comprising steps of preparing a substrate on which a latent image pattern is formed, and developing the latent image pattern, wherein the preparing step includes steps of generating a second signal by converting a first signal obtained by stretching an impulse signal on a space axis into a positive value, obtaining an image that is output from the imaging optical system as an output signal when a light intensity distribution is inputted as the second signal, and calculating the transfer characteristic of the imaging optical system by convolution of a third signal with a fourth signal that is obtained by canceling a bias component of the output signal obtained by the sensor, the third signal being an impulse signal upon convolution with the first signal.

According to the fourth aspect of the present invention, there is provided a transfer characteristic calculation method of generating a second signal by converting a first signal obtained by stretching an impulse signal on a space axis into a positive value, obtaining an image that is output from the imaging optical system as an output signal when a light intensity distribution is inputted as the second signal, and calculating the transfer characteristic of the imaging optical system by convolution of a third signal with a fourth signal that is obtained by canceling a bias component of the output signal obtained by the sensor, the third signal being an impulse signal upon convolution with the first signal.

Further features of the present invention will become apparent from the following description of exemplary embodiments with reference to the attached drawings.

BRIEF DESCRIPTION OF THE DRAWINGS

FIGS. 8A and 8B are views showing offset amounts by a TIS-WIS interaction;

DESCRIPTION OF THE EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-95854, filed Mar. 30, 2006, which is hereby incorporated by reference herein in its entirety.

Further objects and features of the present invention will become apparent from the preferred embodiments to be described below with reference to the accompanying drawings.

First Embodiment

Figure 1:
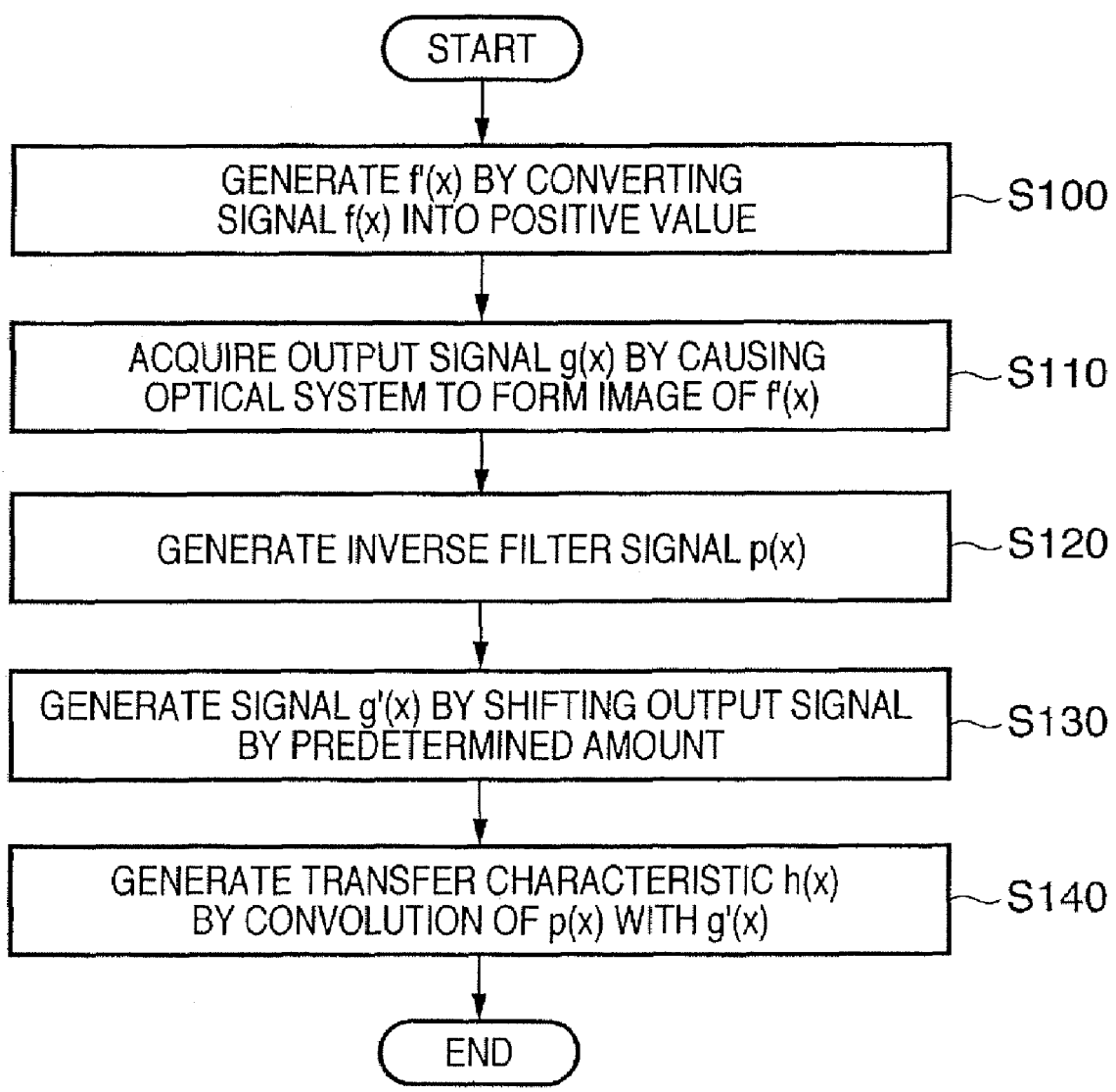
FIG. 1 is a flowchart for explaining the preferred first embodiment of the present invention.

In the preferred first embodiment of the present invention, a method of calculating the transfer characteristic of an imaging optical system will be described. FIG. 1 is a flowchart for explaining a transfer characteristic calculation method according to this embodiment.

There are proposed methods of obtaining the transfer characteristic of a linear system by inputting a non-impulse signal instead of directly inputting an impulse signal. A time stretched pulse used in the audio field will be described. An impulse signal generally has a very low energy. It is therefore difficult to execute measurement at a sufficient S/N ratio. In the audio field, a signal (TSP: Time Stretched Pulse) is used, whose energy is increased by stretching an impulse on the time axis. As for a transfer characteristic calculation method using a TSP signal, see Japanese Patent Laid-Open No. 3-6467. The frequency domain of the TSP signal is given by:

$$H(k) = \exp(j4\pi M k^2 / N^2) \quad \left(0 \leq k \leq \frac{N}{2}\right) \quad (2)$$
$$= H^*(N-k) \quad \left(\frac{N}{2} < k < N\right)$$

where
N: TSP length (integer)
M: TSP Stretch (integer)
*: complex conjugate.

A characteristic feature of equation (2) is that it is designed on the frequency axis so that the amplitude is flat, and the phase changes in proportion to the square of the frequency. When it undergoes an inverse Fourier-transform, a signal having a frequency that smoothly shifts with time is obtained. In equation (2), conjugate symmetry is formed on the frequency axis so that a real number is obtained by returning it to the time axis. The phase changes in proportion to the square of the frequency, as described above. However, the phase only needs to change with respect to frequency in accordance with a monotone increasing, nonlinear, and continuous function. For example, the phase may change in proportion to the logarithm of the frequency.

Let f(n) be the TSP signal. Then, the signal f(n) can be obtained by calculating the inverse Fourier-transform of H(k) given by equation (2) by:

$$f(n) = \frac{1}{N} \sum_{k=0}^{N-1} H(k) \exp\left(j \frac{2\pi n k}{N}\right). \quad (3)$$

The TSP signal is input into an unknown system. A convolution process with a signal (called an inverse filter of the TSP signal or an inverse TSP signal) is executed so that its output signal and the TSP signal should generate an impulse upon convolution. This allows for calculation of the impulse response, i.e., the transfer characteristic of the system.

A method of calculating the transfer characteristic of an optical system according to this embodiment will be described next. The difference between audio and optics will be described. Sound is a compression wave which is expressed as being positive when the density is higher (compression) than the normal pressure (so-called atmospheric pressure) and as being negative when the density is lower (rarefaction) upon propagation. To the contrary, light is an intensity signal and has no concept of being negative. That is, light takes no positive/negative value, unlike the TSP signal. As a characteristic feature of the present invention, a signal having a non-negative value is newly used as an input signal (light intensity distribution) to a system in place of the TSP signal used in audio.

Audio is a signal with a temporal change. Hence, a signal obtained by stretching an impulse signal on the time axis is used as the TSP signal. To the contrary, a signal used in an optical system changes spatially (the signal is distributed in a positional space). Hence, as a characteristic feature, the input signal used in the present invention is a signal (to be referred to as a "space stretched pulse" hereinafter) obtained by stretching an impulse signal on the space axis. The "space stretched pulse" can be generated by replacing the time axis of the TSP signal with the space axis.

The transfer characteristic calculation method according to this embodiment will be described next with reference to FIG. 1.

Figure 9A:
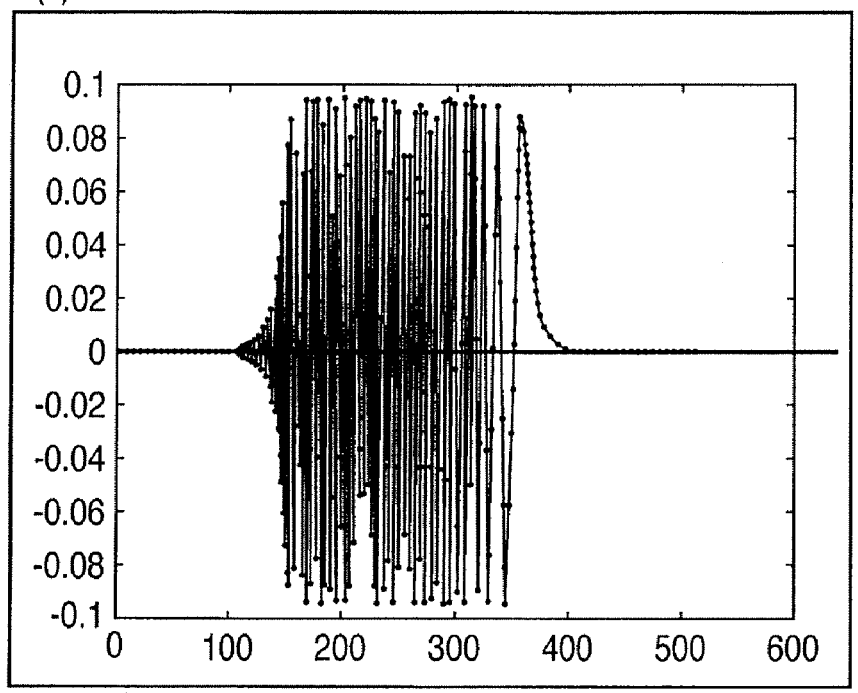
FIG. 9A is a graph showing a space stretched pulse according to the preferred first embodiment of the present invention.
Figure 9B:
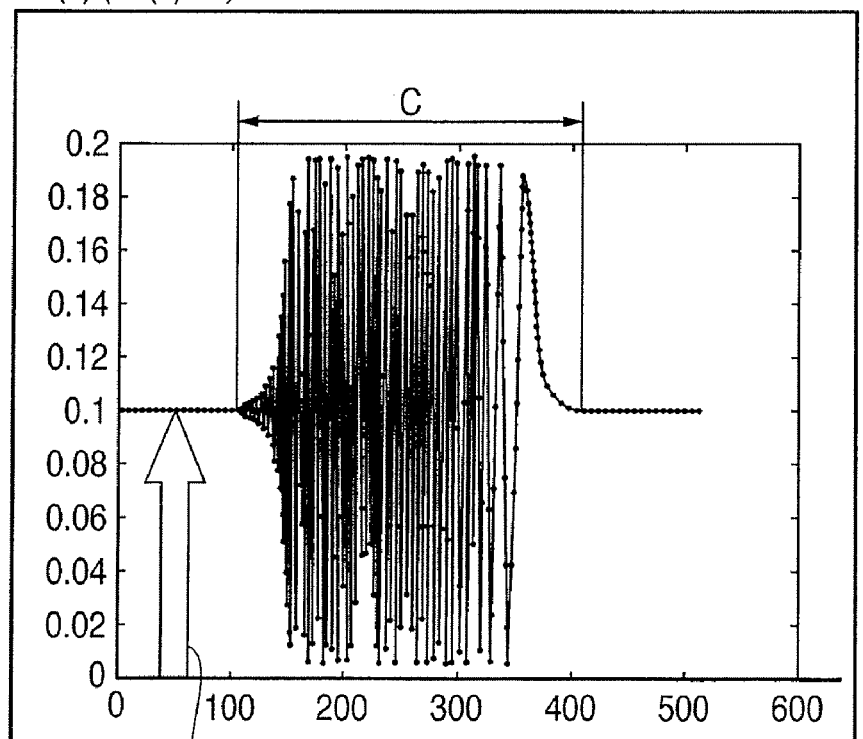
FIG. 9B is a graph showing a signal obtained by spatially shifting the space stretched pulse by a first amount.

In step S100, a space stretched pulse f(x) shown in FIG. 9A is spatially shifted by a first amount α, as shown in FIG. 9B. A signal f'(x) (=f(x)+□) having a positive value is generated as an input signal. The first amount α only needs to make the minimum value of f(x) larger than 0.

In step S110, a light intensity distribution represented by the input signal f'(x) is formed by the optical system, thereby obtaining an output signal g(x) showing the formed image.

Figure 10A:
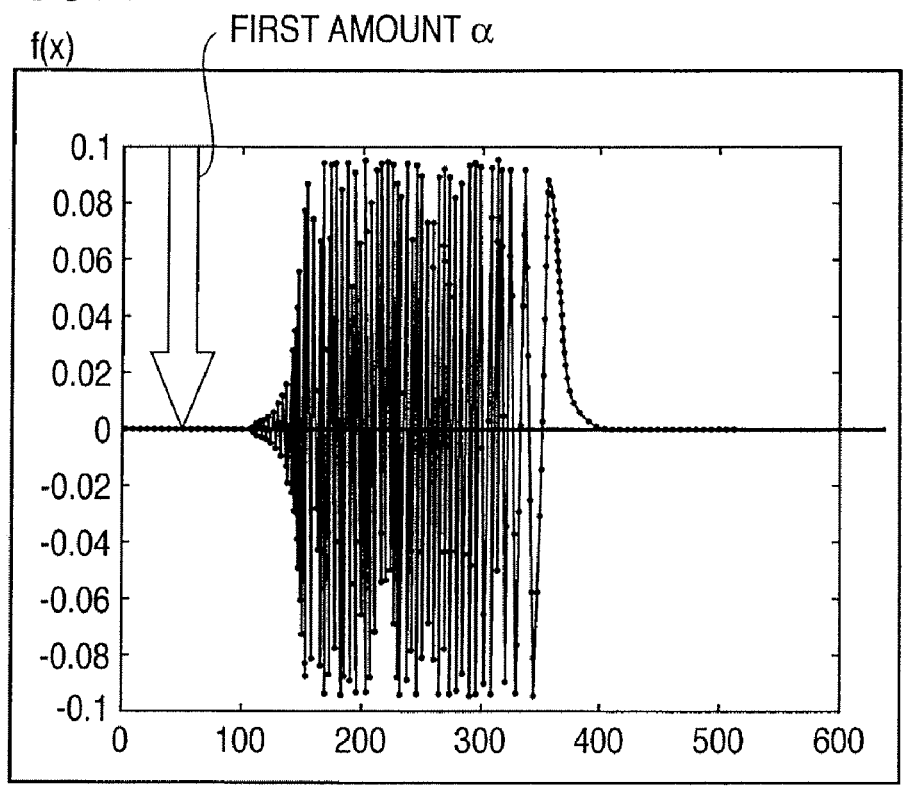
FIG. 10A is a graph showing a signal obtained by reconstructing the space stretched pulse by subtracting the first amount from the input signal shown in FIG. 9B.
Figure 10B:
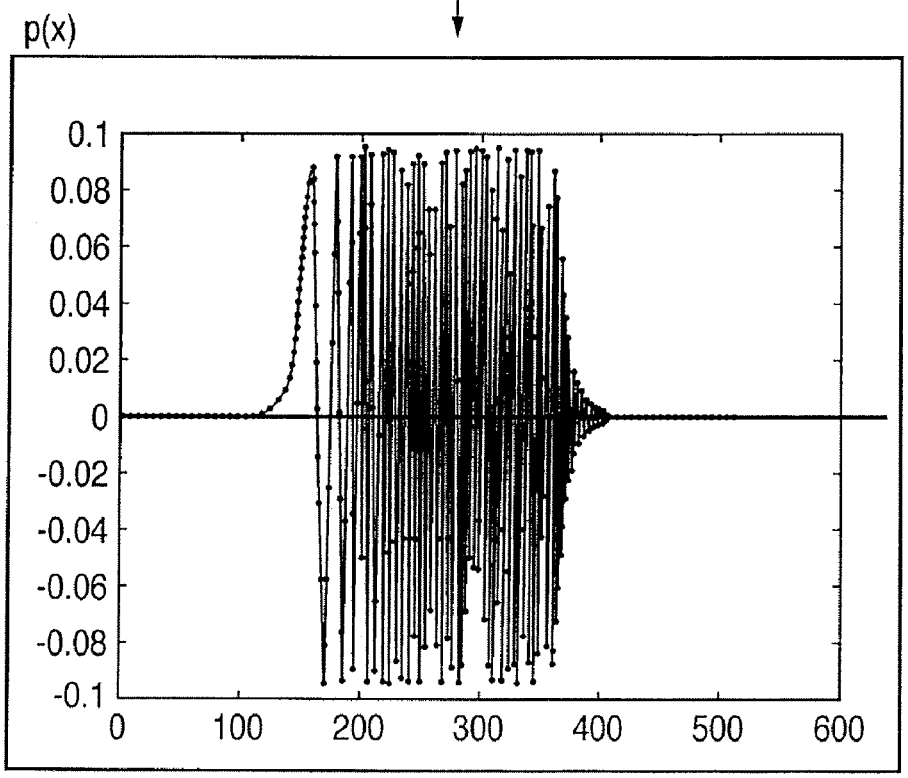
FIG. 10B is a graph showing an inverse filter signal according to the preferred first embodiment of the present invention.

In step S120, the control unit 170 generates a signal (to be referred to as an "inverse filter signal" hereinafter) p(x) shown in FIG. 10B, which forms an impulse upon convolution with the space stretched pulse f(x) (corresponding to a signal obtained by subtracting the first amount α from the input signal f'(x)) shown in FIG. 10A.

Figure 11A:
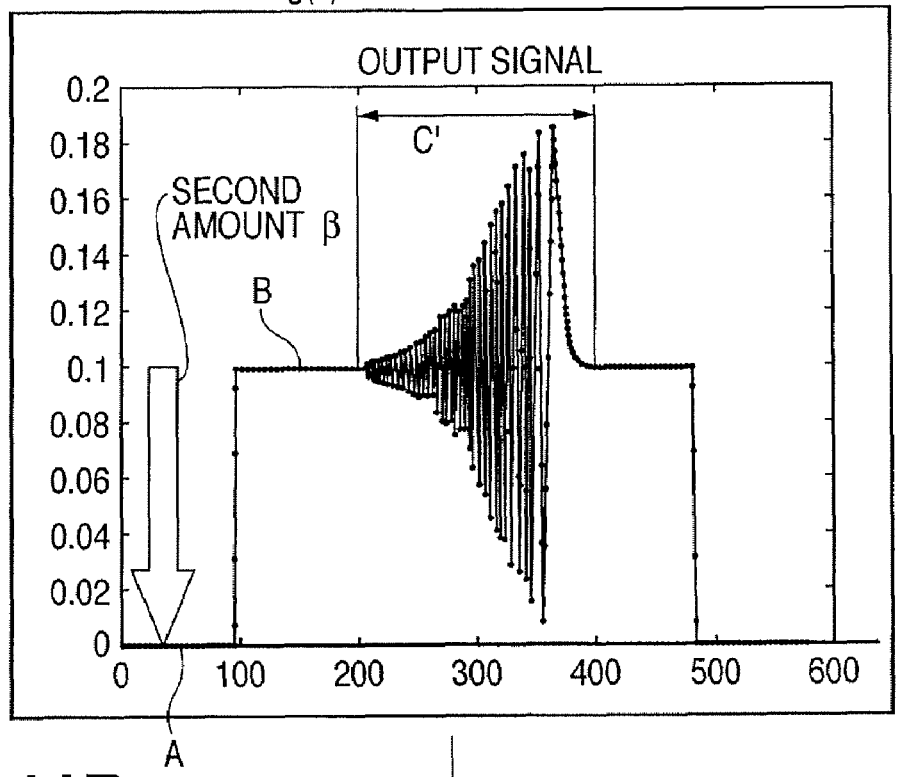
FIG. 11A is a graph showing an output signal.
Figure 11B:
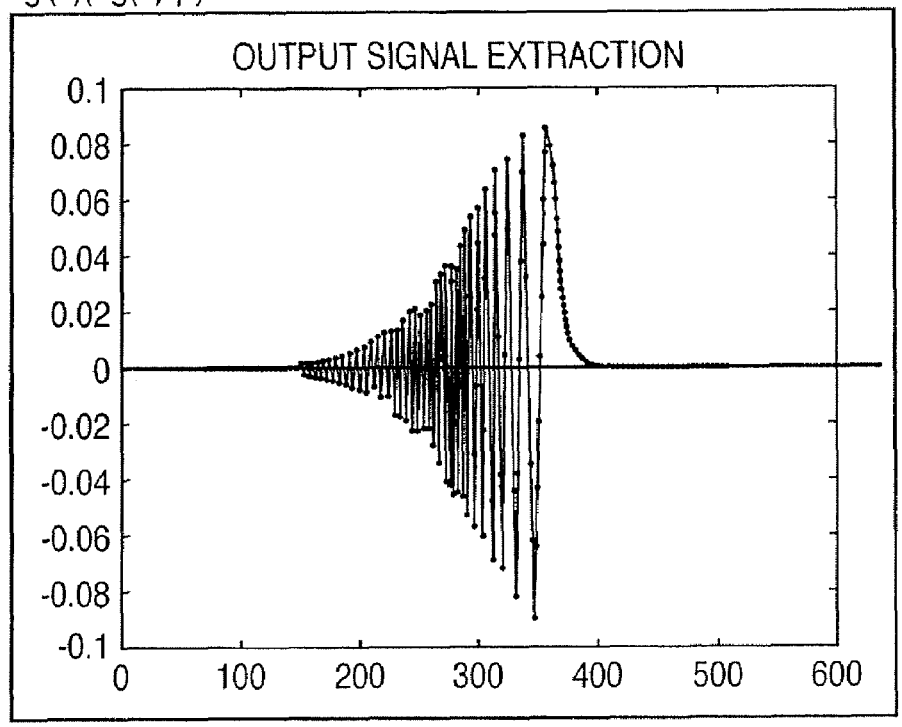
FIG. 11B is a graph showing a signal obtained by spatially shifting the output signal by a second amount in the preferred first embodiment of the present invention.

In step S130, the control unit 170 spatially shifts the output signal g(x) by a second amount β, as shown in FIG. 11B, such that the bias component contained in the output signal g(x) shown in FIG. 11A is canceled. The third generation unit generates a signal g'(x) (=g(x)−β). The second amount β equals the difference between A indicating zero and a bias component B of the signal in FIG. 11A. More specifically, the bias component can be canceled by letting C' in FIG. 11A be the response part for a region (C in FIG. 9B, which is called the effective duration of the signal) containing the effective signal component in, e.g., FIG. 9B, and β be the value that is sufficiently stable before and after C'.

In step S140, the control unit 170 executes a convolution process by applying g'(x) and the inverse filter signal p(x) to equation (4), thereby calculating a transfer characteristic h(x) of the optical system.

$$h(x) = g'(x) * p(x) \quad (4)$$
$$= \int_{-\infty}^{\infty} g'(\tau) \cdot p(x-\tau) d\tau$$

In the above-described way, according to this embodiment, it is possible to more accurately calculate the transfer characteristic of an imaging optical system by using a signal stretched on the space axis in place of an impulse signal.

In this embodiment, an imaging optical system has been described in which the coordinate system on the input signal, i.e., object side matches that on the output signal, i.e., image side. However, the coordinate systems do not always match depending on the optical magnification. In this case, let f'(x) be the signal predicted by the geometrical optics on the image side from the object-side input signal, h(x) be the transfer characteristic on the image side, and g(x) be the image-side output signal in accordance with the coordinate system on the image side. In this case, g(x) is obtained through convolution of f'(x) and h(x). Hence, this embodiment is applicable.

Second Embodiment

The preferred second embodiment of the present invention will be described next with reference to FIGS. 12A and 12B.

Figure 12A:
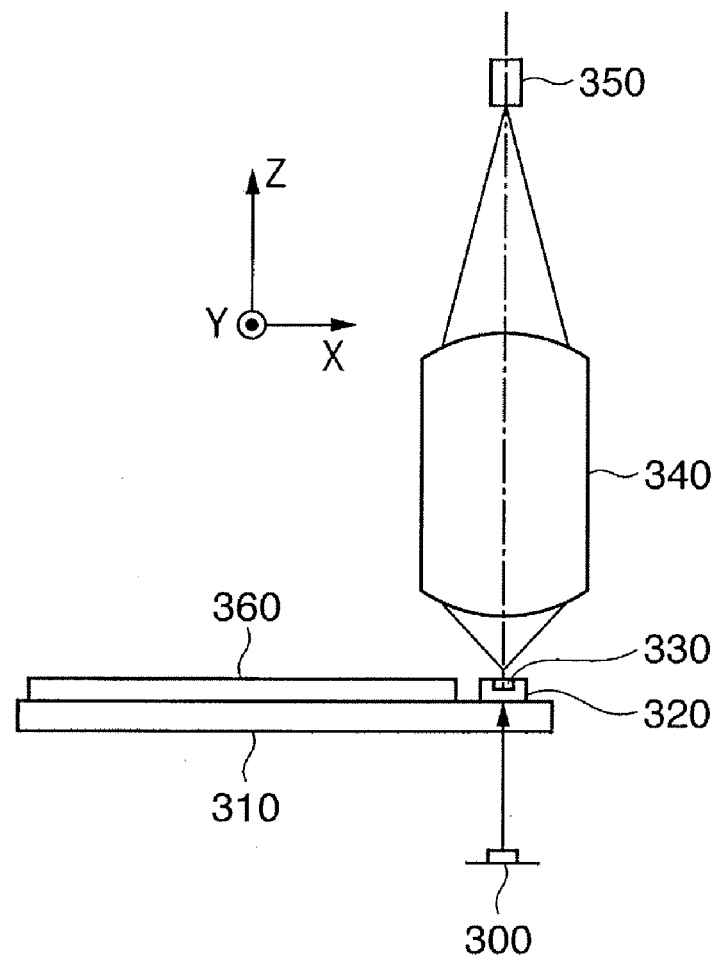
FIGS. 12A and 12B are views of a transfer characteristic calculation apparatus according to the preferred second embodiment of the present invention.
Figure 12B:
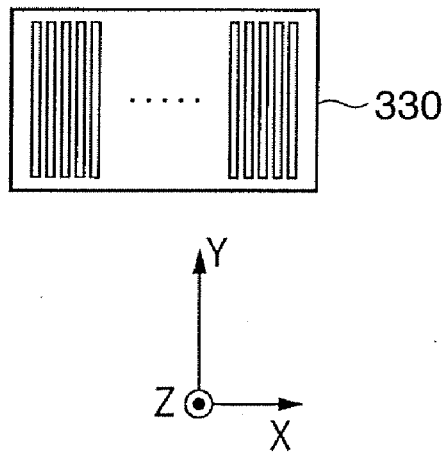

FIGS. 12A and 12B are views showing an example of an apparatus for calculating the transfer characteristic of an imaging optical system 340 according to the preferred second embodiment of the present invention. In the second embodiment, in step S100, a signal f'(x) is generated by converting a space stretched pulse f(x) into a positive value. More specifically, the signal f'(x) is generated using a liquid crystal grating 330. Light coming through the liquid crystal grating 330 is incident on the imaging optical system 340. The remaining processes are the same as those in FIG. 1.

Referring to FIG. 12A, a reference table 320 is arranged on a stage 310 at the same Z-coordinate position as that of an imaging target object 360, such as a wafer. The liquid crystal grating 330 is arranged on the reference table 320. Illumination light 300 illuminates the liquid crystal grating 330 from the lower surface. After the imaging optical system 340 forms an image, an output signal is acquired by a sensor 350, such as a CCD.

The illumination light 300 preferably has the same characteristic as that of a light source (not shown) used to illuminate the imaging target object 360. Illumination light from a light source may be guided by using, e.g., an optical fiber. FIG. 12B is a plan view of the liquid crystal grating 330. The liquid crystal grating 330 has a pattern that continues in the non-measuring direction (Y direction in FIG. 12B) and separates in the measuring direction (X direction in FIG. 12B). It is possible to change the light intensity of the light traveling through the liquid crystal grating by changing a pitch of a lattice pattern of the liquid crystal grating 330 using electrical control. For example, the desired input signal f(x) can be generated by multilevel control for, e.g., 256 gray levels. The sensor 350 can be either a line sensor or a two-dimensional sensor.

FIG. 12B illustrates the liquid crystal grating 330 for measurement in the X direction. The output signal formed by the imaging optical system 340 also has a distribution in the X direction. For this reason, the sensor 350 may execute processing by using a line sensor arranged in the X direction or by using only the X-direction component of a two-dimensional sensor. The liquid crystal grating for measurement in the Y direction is obtained by rotating the liquid crystal grating for X-direction measurement in FIG. 12B about the X-axis by 90°. At this time, the sensor 350 can execute processing by using a line sensor arranged in the Y direction or by using only the Y-direction component of a two-dimensional sensor.

Third Embodiment

The preferred third embodiment of the present invention will be described. In the third embodiment, a preferred transfer characteristic calculation method of an imaging optical system of the present invention is applied to the alignment system of a semiconductor exposure apparatus.

Figure 2:
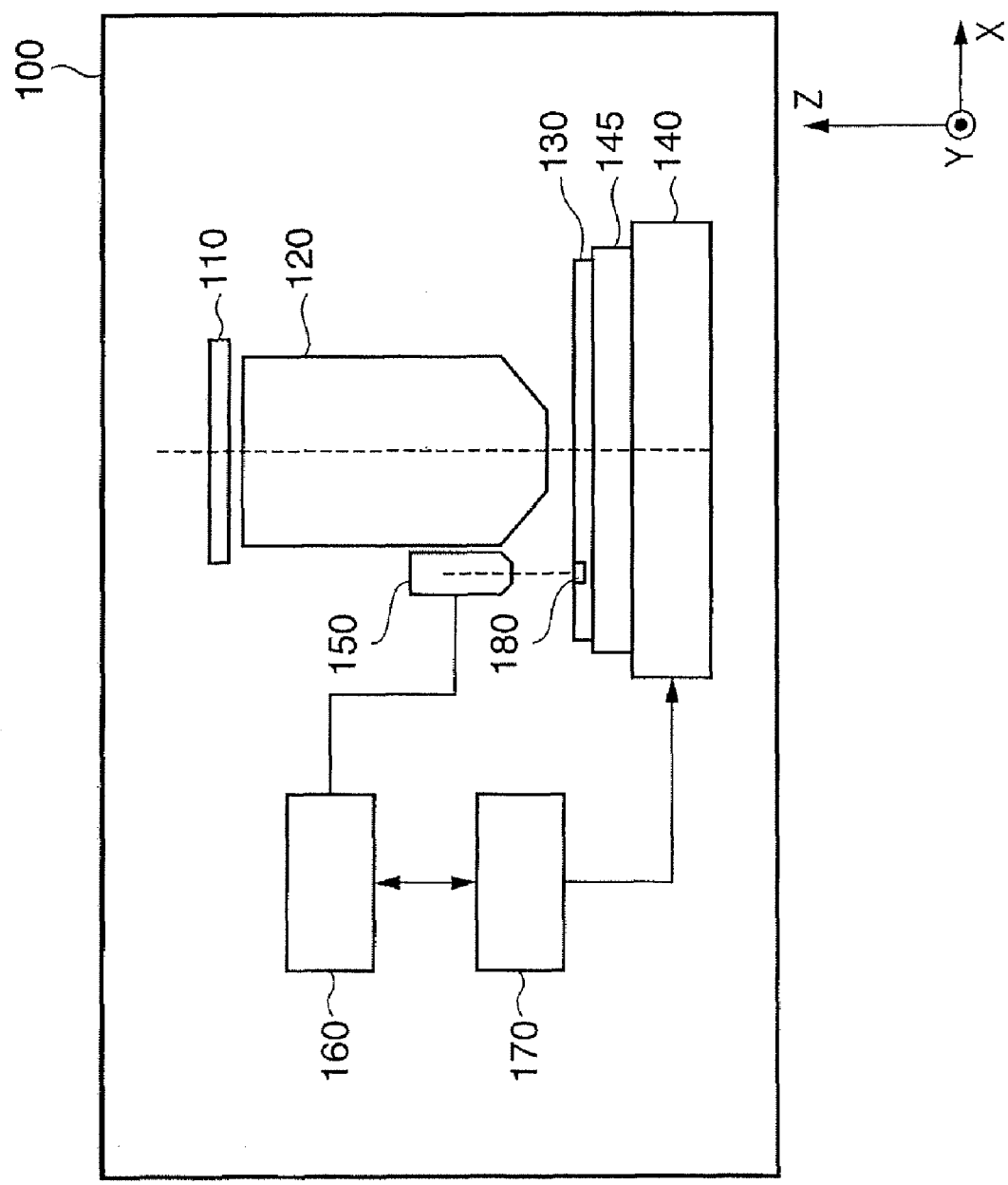
FIG. 2 is a schematic block diagram showing an exposure apparatus according to a preferred embodiment of the present invention.

FIG. 2 is a block diagram of an exposure apparatus 100. The exposure apparatus 100 is a projection exposure apparatus which exposes a circuit pattern formed on a reticle to a wafer by, e.g., step and scan or step and repeat. The projection exposure apparatus is suitable for a lithography process on the order of sub-microns or quarter microns or less. "Step and scan" is an exposure method which continuously scans a wafer with respect to a reticle to expose the wafer to the reticle pattern and step-moves the wafer to the next exposure region after exposure of one shot. "Step and repeat" is an exposure method which step-moves a wafer to the next exposure region after every full plate exposure of the wafer.

Referring to FIG. 2, the exposure apparatus 100 comprises a projection optical system 120, wafer chuck 145, wafer stage device 140, alignment optical system 150, alignment signal processing unit 160, and control unit 170. The projection optical system 120 reduces and projects a reticle 110 with a pattern such as a circuit pattern drawn. The wafer chuck 145 holds a wafer 130 which has an underlayer pattern and an alignment mark 180 formed by the preprocess. The wafer stage device 140 positions the wafer 130 to a predetermined position. The alignment optical system 150 measures the position of the alignment mark 180 on the wafer 130. FIG. 2 does not illustrate a light source or an illumination optical system which illuminates the reticle 110 with light from the light source.

The control unit 170 has a CPU (not shown) and a memory and controls the operation of the exposure apparatus 100. The control unit 170 electrically connects to an illumination device (not shown), reticle stage device (not shown), wafer stage device 140, and alignment signal processing unit 160. Based on the alignment mark position information from the alignment signal processing unit 160, the control unit 170 positions the wafer 130 via the wafer stage device 140.

Figure 3:
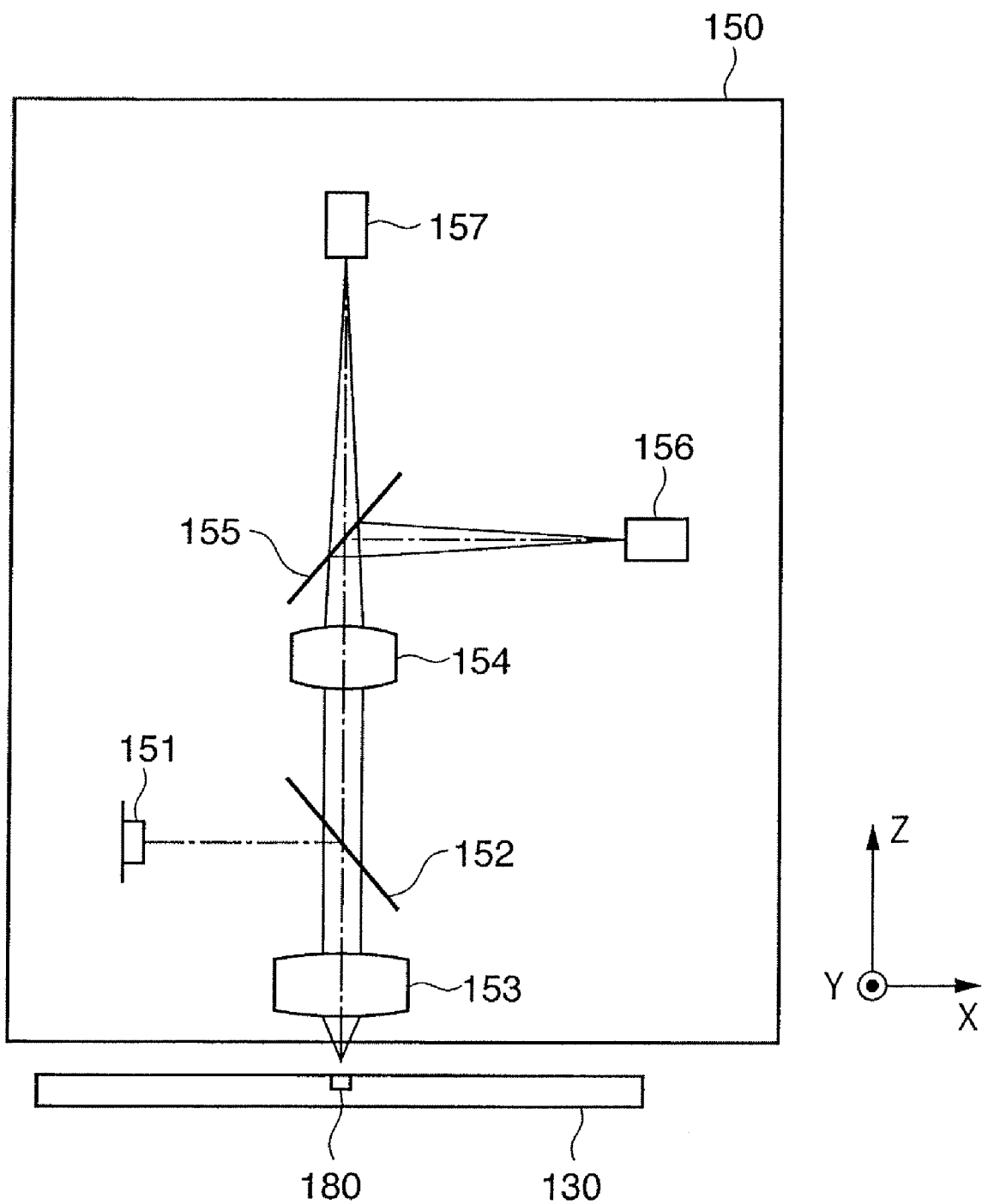
FIG. 3 is a schematic optical path chart showing main constituent elements of an alignment optical system shown in FIG. 2.

The detection principle of the alignment mark 180 will be described. FIG. 3 is an optical path chart showing main constituent elements of the alignment optical system 150. Referring to FIG. 3, a beam splitter 152 reflects illumination light from an alignment light source 151 so that the light passes through an objective lens 153 and illuminates the alignment mark 180 on the wafer 130. Light (reflected light or diffracted light) from the alignment mark 180 passes through the objective lens 153, beam splitter 152, and lens 154 so that the light is split by a beam splitter 155, and received by sensors 156 and 157, such as CCDs.

The alignment mark 180 is enlarged to an imaging magnification of about one hundred times through the lenses 153 and 154 and forms an image on the sensors 156 and 157. The sensors 156 and 157 are sensors for measuring shifts of the alignment mark 180 in the X and Y directions and are installed at 90° with respect to the optical axis. As the sensors 156 and 157, a line sensor may be used. In this case, it is preferable to condense light in the measuring directions and vertical direction through a cylindrical lens having power only in the measuring directions and vertical direction, and executing optical integration and averaging. Position measurement in the X direction will be described here.

Figure 4A:
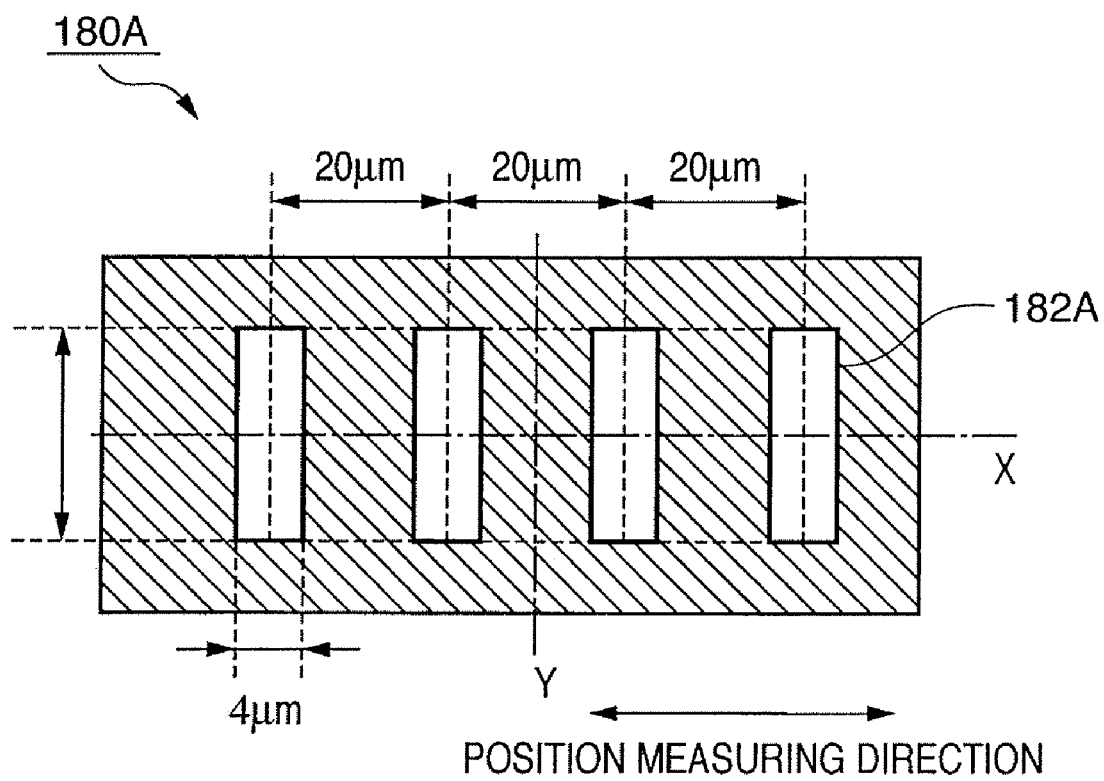
FIG. 4A is a schematic plan view of the alignment mark shown in FIG. 2.
Figure 4B:
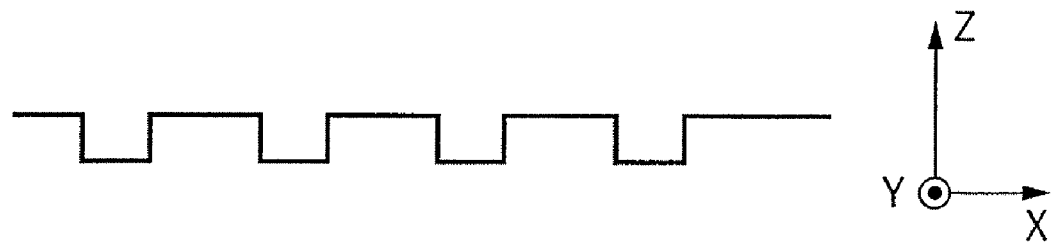
FIG. 4B is a schematic sectional view of the alignment mark shown in FIG. 2.
Figure 5A:
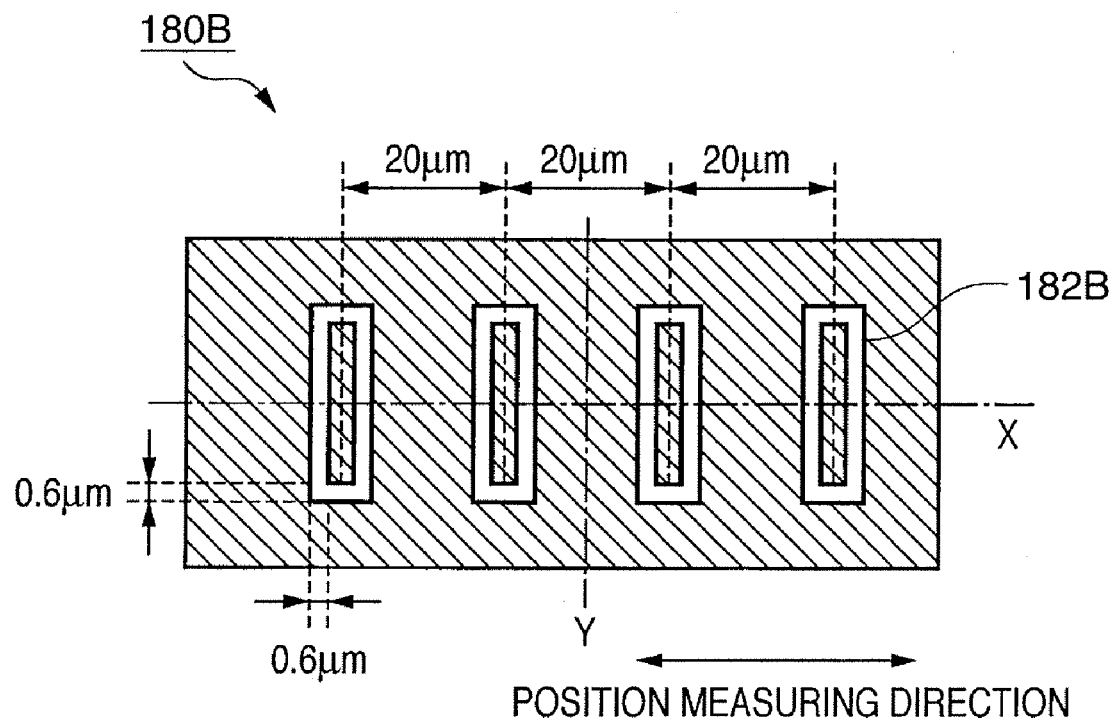
FIG. 5A is a schematic plan view of the alignment mark shown in FIG. 2.
Figure 5B:
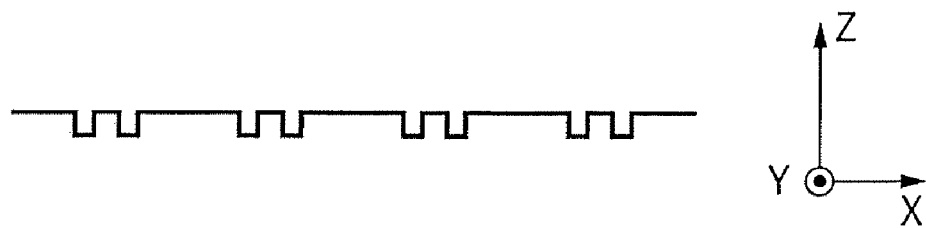
FIG. 5B is a schematic sectional view of the alignment mark shown in FIG. 2.

The alignment mark 180 is arranged on a scribing line of each shot. For example, alignment marks 180A and 180B having a shape shown in FIG. 4A are usable. The alignment mark 180 represents the alignment marks 180A and 180B. FIGS. 4A and 4B are plan and sectional views of the alignment mark 180A. FIGS. 5A and 5B are plan and sectional views of the alignment mark 180B. Referring to FIGS. 4A, 4B, 5A, and 5B, the alignment marks 180A and 180B include four mark elements 182A and 182B which are arranged at equal intervals, respectively. In fact, a resist is applied to the alignment marks 180A and 180B, though FIGS. 4A, 4B, 5A, and 5B do not illustrate the resist.

As shown in FIG. 4A, in the alignment mark 180A, four rectangular mark elements 182A each having a size of 4 μm in the X direction, i.e., measuring direction and 20 μm in the Y direction, i.e., non-measuring direction, are arranged in the X direction at a pitch of 20 μm. As shown in FIG. 4B, the mark element 182A has a concave sectional shape. On the other hand, in the alignment mark 180B, four rectangular mark elements 182B each obtained by replacing the outline portion of the mark element 182A shown in FIGS. 4A and 4B with a line width of 0.6 μm are arranged, as shown in FIGS. 5A and 5B.

Figure 6:
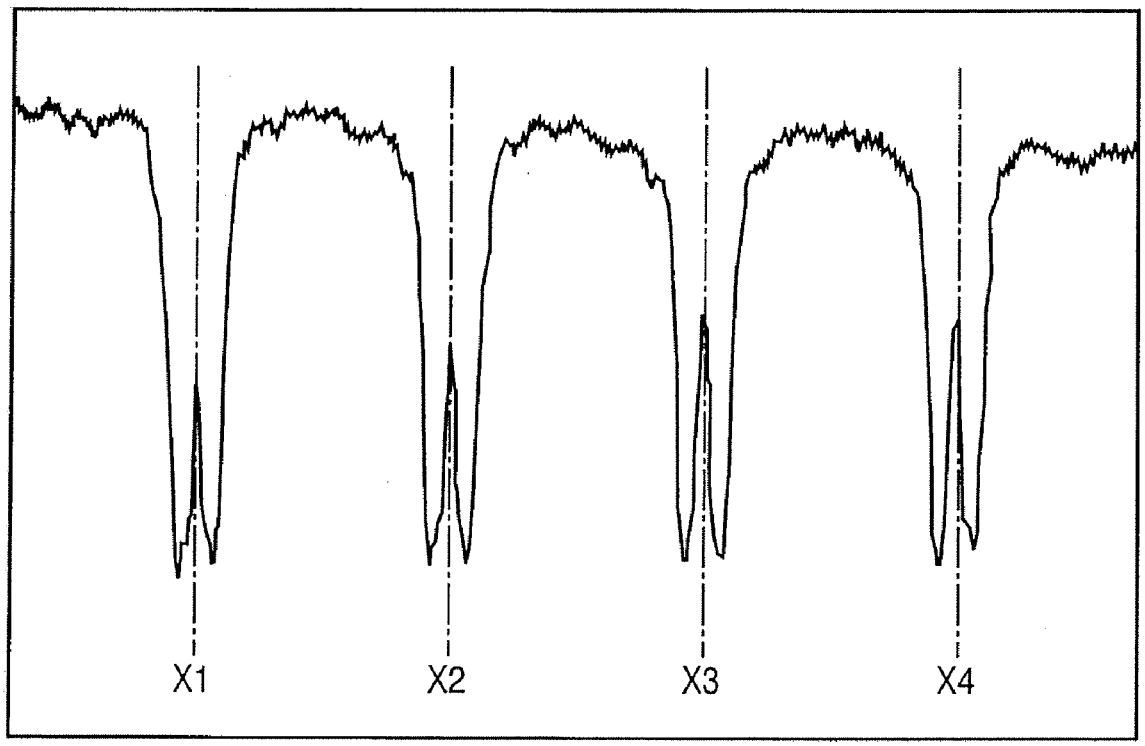
FIG. 6 is a graph showing a typical detection result obtained by optically detecting the alignment marks shown in FIGS. 4A, 4B, 5A, and 5B.

FIG. 6 is a graph showing a typical result obtained by optically detecting the alignment marks 180A and 180B shown in FIGS. 4A, 4B, 5A, and 5B and causing the sensor 156 to capture their images. In the optical image obtained in FIG. 6, generally, the high-frequency component at the edge of the alignment mark is cut. For both the alignment marks 180A and 180B, scattered light is generated at the edge with a large angle outside the NA of the lenses 153 and 154 of the alignment optical system 150. For this reason, it is impossible to make all signals, i.e., all pieces of information from the alignment mark pass through the alignment optical system 150. In the alignment optical system 150, the information always degrades, and the high-frequency component is cut. The outline portion of the alignment mark 180A is dark. The concave portion of the alignment mark 180B is dark or bright. This is a characteristic feature of an image that is often observed as a bright field image. The sensed image of the alignment mark 180 undergoes an alignment signal process by the alignment signal processing unit 160.

Figure 7:
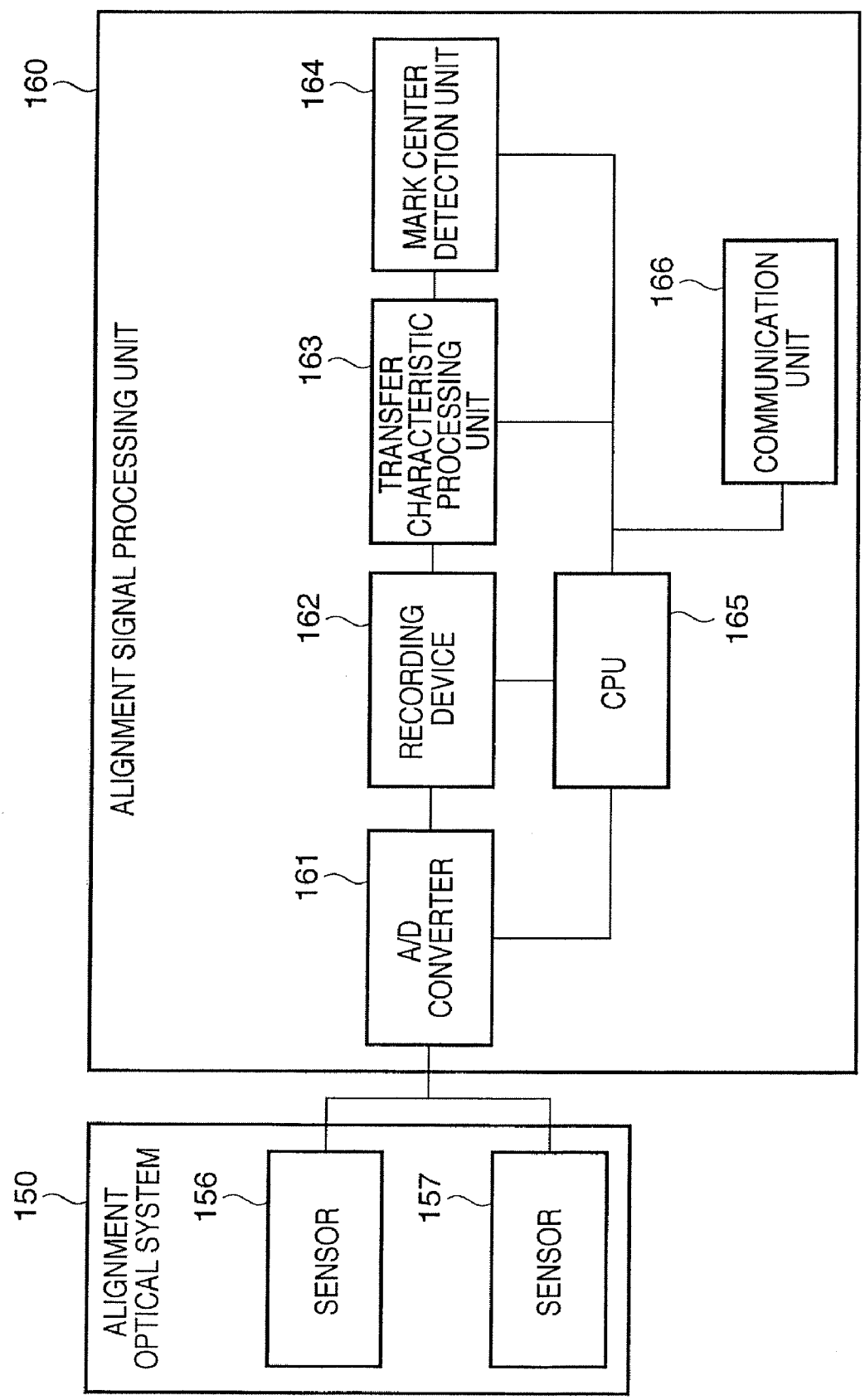
FIG. 7 is a schematic block diagram showing main functional modules incorporated in an alignment signal processing unit shown in FIG. 2.

FIG. 7 is a block diagram showing main functional modules incorporated in the alignment signal processing unit 160.

Referring to FIG. 7, an A/D converter 161 converts an alignment signal from the sensors 156 and 157 into a digital signal. The digitized alignment signal is recorded in the internal memory of a recording device 162. A transfer characteristic processing unit 163 executes TIS correction of the degraded alignment mark output signal recorded in the recording device 162 by using the transfer characteristic h(x) calculated by the control unit 170 in FIG. 2, and reconstructs the alignment signal. A mark center detection unit 164 detects the central position of the alignment mark by executing a digital signal process of the reconstructed alignment signal. A CPU 165 connected to the A/D converter 161, recording device 162, transfer characteristic processing unit 163, and mark center detection unit 164 outputs a control signal to control the operation. A communication unit 166 communicates with the control unit 170 shown in FIG. 2 and exchanges necessary data and control commands.

For the digital signal process executed by the mark center detection unit 164, various methods are proposed, including a method of detecting the edge of the alignment signal and calculating the position of the edge, pattern matching using a template, and symmetry matching (patent reference 2).

The signal source can be either a two-dimensional signal or a one-dimensional signal. When a vertical histogram of horizontal pixels of a two-dimensional image is formed, and an image voting process and averaging of major components are executed, the two-dimensional image can be converted into a one-dimensional image. In the digital signal process proposed in the present invention, the X- and Y-direction measurements use independent systems. Hence, the signal process serving as the base of positioning is determined by a one-dimensional signal process. For example, a two-dimensional image on the sensors 156 and 157 is converted into a one-dimensional line signal by integration and averaging using a digital signal.

The transfer characteristic calculation method of the second embodiment uses transmitted light. To the contrary, the transfer characteristic calculation method of the third embodiment directly uses the alignment light source 151 as epi-illumination.

Figure 13:
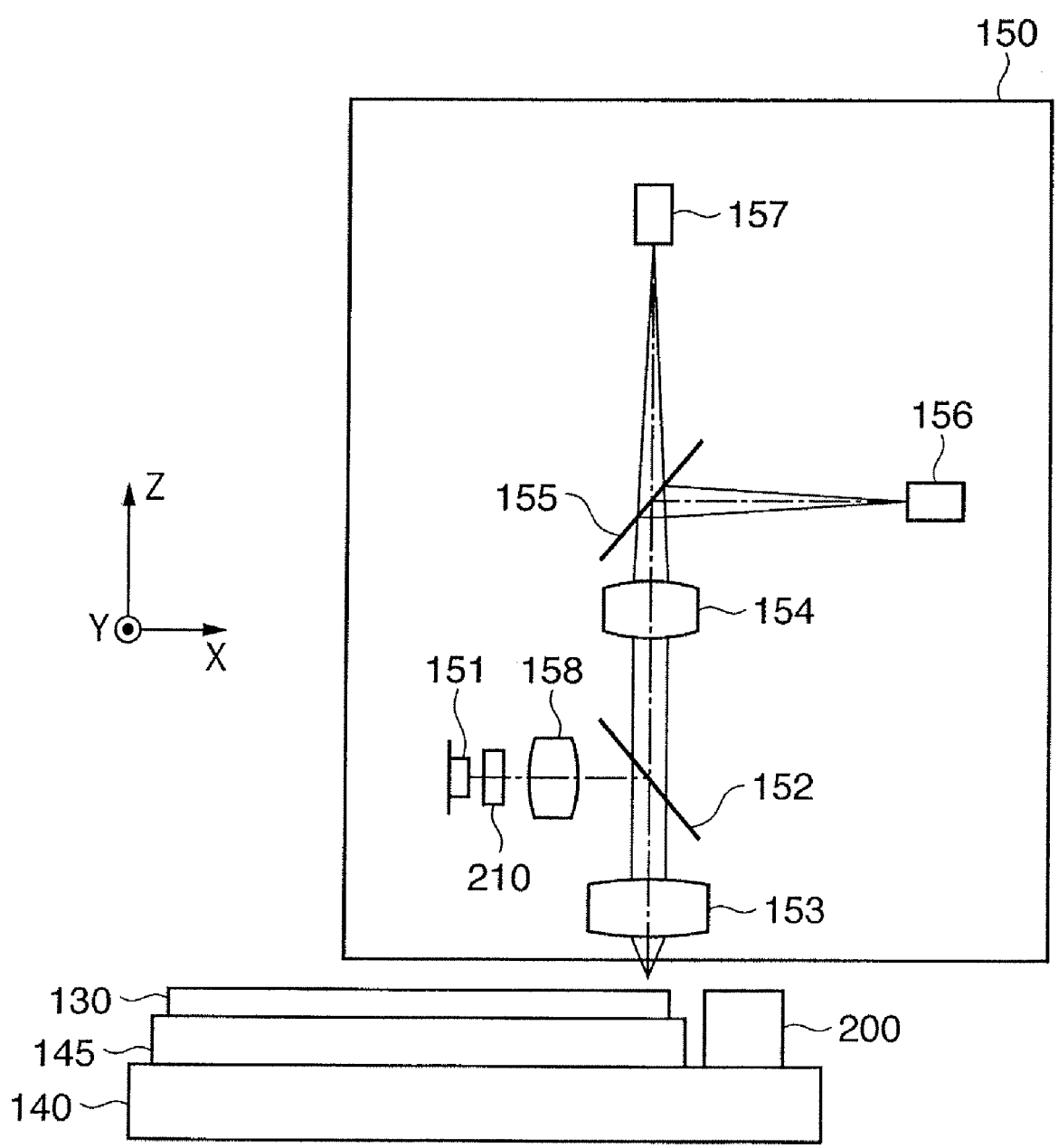
FIG. 13 is a view of a transfer characteristic calculation apparatus according to the preferred third embodiment of the present invention.

FIG. 13 is a view for explaining this embodiment. Referring to FIG. 13, a liquid crystal grating 210 is arranged near the alignment light source 151. Illumination light from the alignment light source 151 illuminates the liquid crystal grating 210. A desired non-impulse input signal f'(x) is generated by changing the grating pattern by controlling an electrical signal. The input signal f'(x) output from the liquid crystal grating 210 passes through a lens 158 and is reflected by the beam splitter 152. The light passes through the objective lens 153, is reflected by the surface of the wafer 130, and passes through the objective lens 153 again. The light passes through the beam splitter 152 and lens 154 and is split by the beam splitter 155. An output signal g(x) with an image formed by the sensors 156 and 157 is obtained. A mirror-reflecting element is preferably arranged on the surface of the wafer 130. For example, a mirror-reflecting mirror may be arranged on a reference mark table 200. The surface of the liquid crystal grating 210 and that of the wafer 130 (or the mirror surface of the reference mark table 200) are conjugate to the lens 158 and objective lens 153.

The transfer characteristic h(x) of the alignment optical system 150 by the objective lens 153 is more dominant than that by the lens 154. Hence, the transfer characteristic by the lens 154 is negligible. Let Th(x) be the total transfer characteristic from the non-impulse signal f'(x) to the output signal g(x). Then, Th(x) can be obtained by the process in steps S100 to S140 in FIG. 1 described in the first embodiment. Let h(x) be the transfer characteristic by the objective lens 153 to be obtained finally. Then, Th(x) and h(x) have a relationship given by:

$$Th(x) = h(x) * h(x). \tag{5}$$

Fourier transform of this yields:

$$TH(\omega) = H(\omega) \times H(\omega). \tag{6}$$

Let $|H(\omega)|$ be the amplitude of $H(\omega)$, and $\angle H(\omega)$ be the phase angle. Then, equation (6) can be rewritten using Euler's formula as $$TH(\omega) = |H(\omega)|\exp(j\angle H(\omega)) \times |H(\omega)|\exp(j\angle H(\omega)) \tag{7}$$

$$= |H(\omega)|^2 \exp(j(2\angle H(\omega)))$$

$H(\omega)$ can be obtained by calculating the square root of the amplitude for each frequency from Fourier transform $TH(\omega)$ of $TH(\omega)$ and dividing the phase by two.

Hence, the transfer characteristic h(x) to be finally obtained can be obtained by inverse Fourier transform of $H(\omega)$.

In this embodiment, the alignment optical system 150 can directly be used for transfer characteristic calculation as epi-illumination. Unlike the second embodiment, the resolving power of the liquid crystal grating 210 in the measuring direction can be low in correspondence with the magnification of the objective lens so that a desired resolving power can be obtained on the wafer.

The position of the alignment mark 180 on an actual wafer is detected in the following way using the transfer characteristic h(x) of the alignment optical system 150 calculated in FIG. 13. The input of the electrical signal to control the liquid crystal grating 210 is turned off to make the liquid crystal grating 210 have a uniform transmittance on the whole surface. For the alignment mark on the wafer, the transfer characteristic processing unit 163 executes a reconstructing process using the obtained transfer characteristic h(x) and the output degraded through the alignment optical system 150. Then, the mark center detection unit 164 detects the position of the alignment mark from the reconstructed signal.

This reduces the influence of the aberration (TIS) of the alignment optical system 150.

Fourth Embodiment

The preferred fourth embodiment of the present invention will be described. In the above-described embodiments, a one-dimensional image is reconstructed. The present invention is not limited to this. The present invention may be used to reconstruct a two-dimensional image such as a general digital camera image. In this case, the transfer characteristic needs to be expanded to the two-dimensional space. To do this, the transfer characteristic is separately obtained in the X and Y directions by the present invention. Then, the input signal is reconstructed from the X- and Y-direction output signals. For example, to reconstruct a two-dimensional image, one-dimensional transfer characteristics in the X and Y directions may be combined into a two-dimensional transfer characteristic, and a two-dimensional image may be reconstructed from using it. To combine the transfer characteristics, various kinds of interpolation processes are possible.

Fifth Embodiment

The transfer characteristic obtained by the present invention may be used not only for signal reconstruction but also as an initial value of a reconstruction algorithm using an iterative process.

Figure 14:
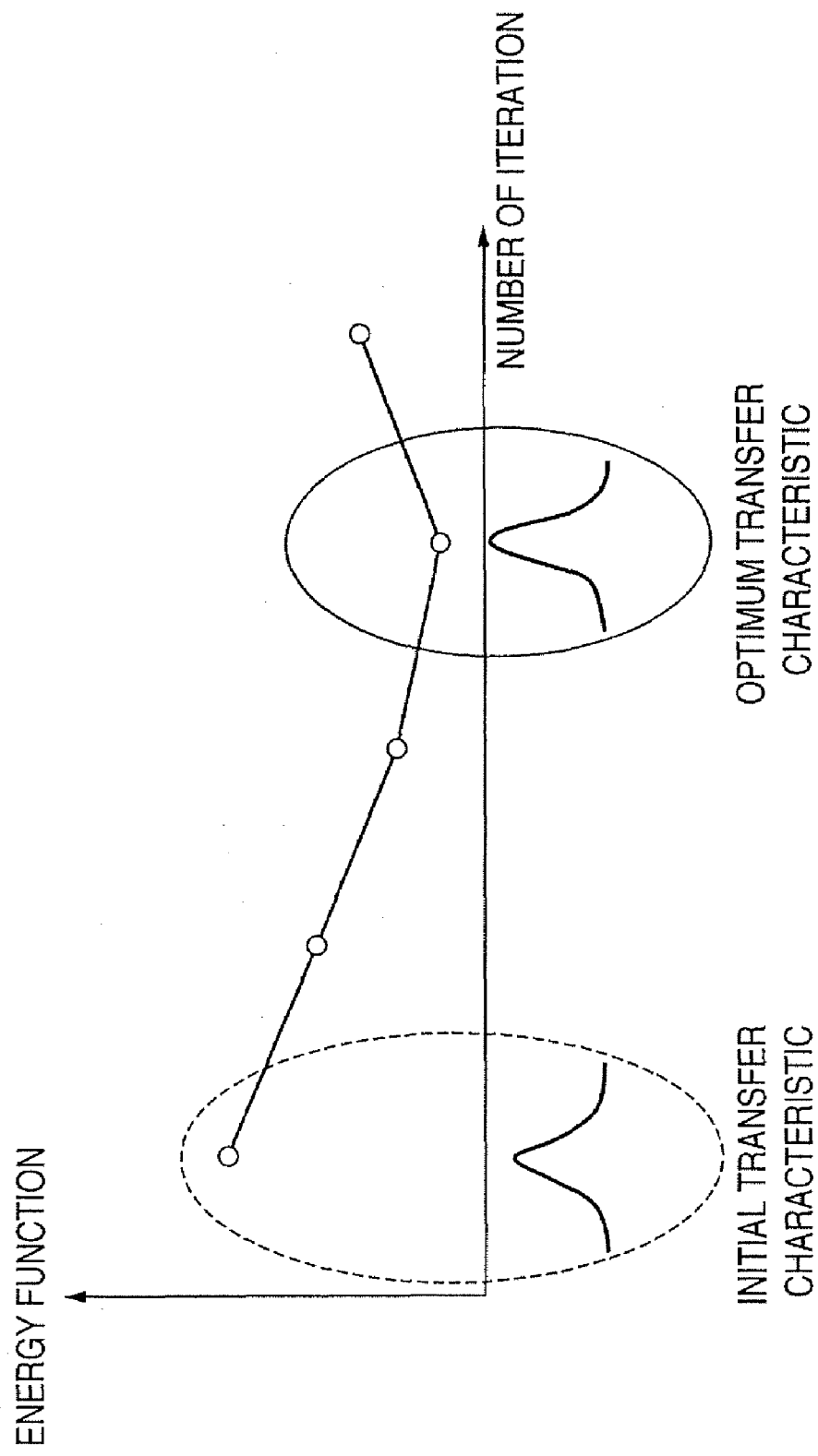
FIG. 14 is a graph showing the concept of obtaining an optimum transfer characteristic by a recursion technique.
Figure 15:
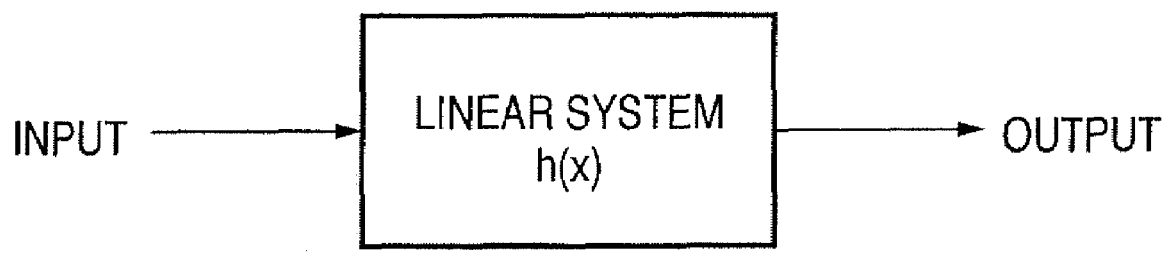
FIG. 15 is a view showing the input/output relationship of a linear system.

It is not practical to use an image reconstruction algorithm using an iterative method for every alignment process, because the number of iterations is generally large. On the other hand, the transfer characteristic rarely changes in every image acquisition because the same optical system is used. Hence, when an iterative process is executed by using the transfer characteristic obtained by the transfer characteristic calculation method of the present invention as, e.g., the initial value for the first wafer of the lot, an optimum transfer characteristic can be obtained. FIG. 14 is a graph showing a concept of the embodiment. The optimum transfer characteristic is determined by an energy minimizing process ("M. Kass, A. Witkin and D. Terzopoulos: SNAKES: Active Contour Models, Proc. of Int. Conf. on Computer Vision, pp. 259-268, 1987) based on an energy function such as entropy. For wafers from then on, a transfer characteristic processing unit 163 in FIG. 4 obtains a reconstructed image by using the optimized transfer characteristic.

As described above, when the optical system has an error such as coma, the alignment signal may be largely distorted by the interaction with a wafer process error near the alignment mark, or an alignment mark position detection error may occur. When the high-frequency component is cut by the NA of the optical system, the alignment signal may degrade, and an alignment mark position detection error may occur. Even in this case, accurate alignment is possible by calculating the transfer characteristic of the optical system in accordance with the preferred embodiment of the present invention and detecting the position of the alignment mark from an alignment signal reconstructed by using the transfer characteristic.

Application Example

Figure 16:
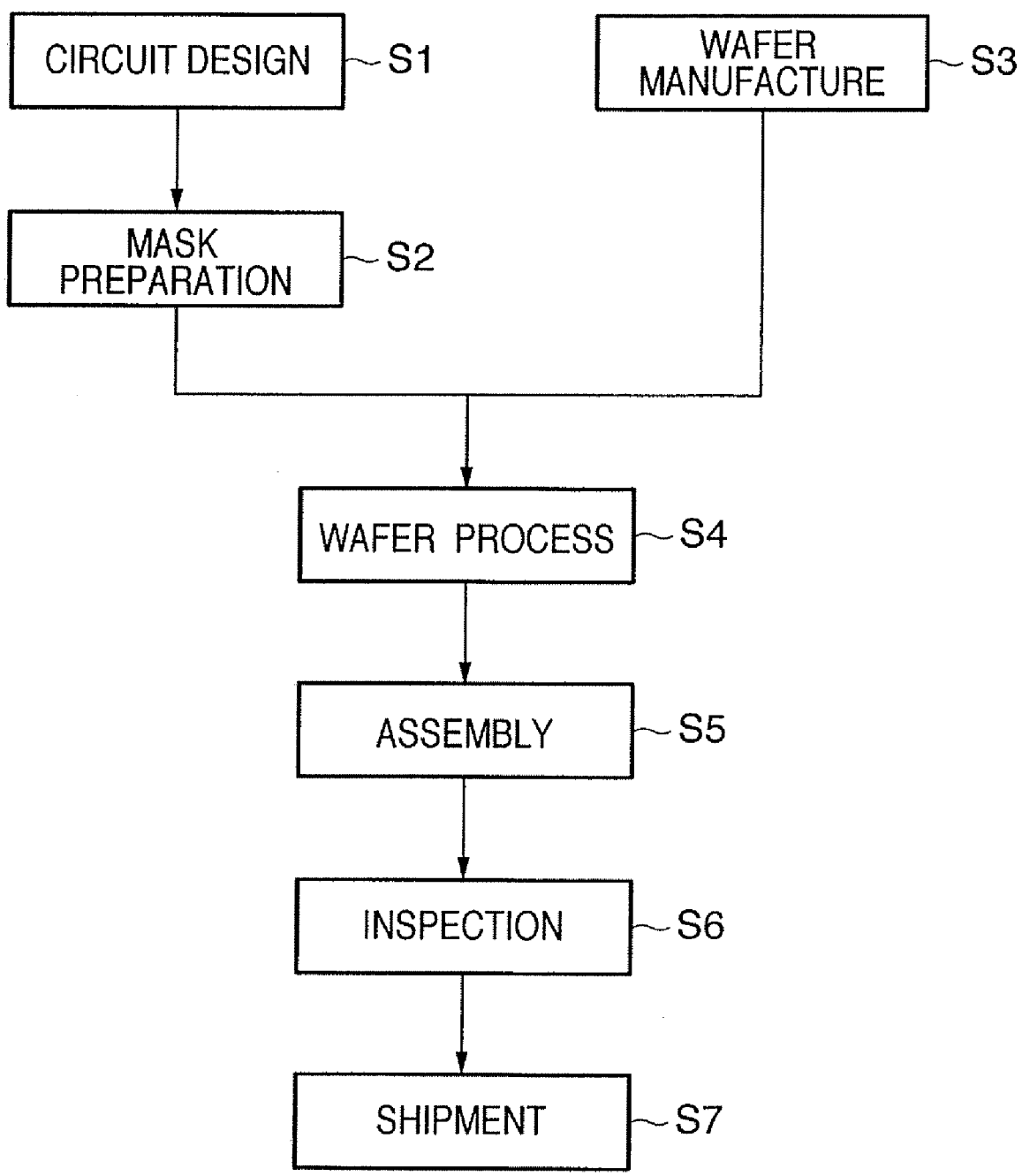
FIG. 16 is a flowchart showing the whole semiconductor device manufacturing process.

A semiconductor device manufacturing process using an exposure apparatus according to the preferred embodiment of the present invention will be described next. FIG. 16 is a flowchart of the whole semiconductor device manufacturing process. In step S1 (circuit design), the circuit of a semiconductor device is designed. In step S2 (mask preparation), a mask (also called a master or reticle) is prepared based on the designed circuit pattern. In step S3 (wafer manufacture), a wafer (also called a substrate) is manufactured using a material such as silicon. Step S4 (wafer process) is called a pre-process, in which the above-described exposure apparatus forms an actual circuit on the wafer by lithography using the mask and wafer. Step S5 (assembly) is called a post-process, in which a semiconductor chip is formed from the wafer prepared in step S4. This step includes processes such as assembly (dicing and bonding) and packaging (chip encapsulation). In step S6 (inspection), inspections including an operation check test and a durability test of the semiconductor device manufactured in step S5 are performed. A semiconductor device is completed with these processes and shipped in step S7.

The wafer process in step S4 includes the following steps: an oxidation step of oxidizing the surface of the wafer, a CVD step of forming an insulating film on the wafer surface, an electrode formation step of forming an electrode on the wafer by vapor deposition, and an ion implantation step of implanting ions into the wafer. The wafer process also includes a resist process step of applying a photosensitive material on the wafer, and an exposure step of exposing the wafer after the resist process step through the mask pattern to form a latent image pattern on the resist by using the exposure apparatus. The process also includes a development step of developing the wafer exposed in the exposure step, an etching step of etching portions other than the latent image pattern developed in the development step, and a resist removal step of removing any unnecessary resist remaining after etching. By repeating these steps, a multilayered structure of circuit patterns is formed on the wafer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-095854, filed on Mar. 30, 2006, which is hereby incorporated by reference herein in its entirety.

What is claimed is:

1. A transfer characteristic calculation apparatus for calculating a transfer characteristic of an imaging optical system, said apparatus comprising:
   a light source;
   a generation unit which generates a second signal by converting a first signal obtained by stretching an impulse signal on a space axis into a positive value using light from the light source;
   a sensor which obtains an image that is output from the imaging optical system as an output signal when a light intensity distribution is input as the second signal; and
   a calculation unit which calculates the transfer characteristics of the imaging optical system by convolution of a third signal with a fourth signal that is obtained by canceling a bias component of the output signal obtained by the sensor, the third signal being an impulse signal upon convolution with the first signal.

2. The apparatus according to claim 1, wherein the generation unit includes a liquid crystal grating, and light as the second signal coming through the liquid crystal grating is incident on the imaging optical system.

3. The apparatus according to claim 1, wherein the first signal, the second signal, the third signal, and the fourth signal are two-dimensional signals.

4. The apparatus according to claim 1, wherein said calculation unit further optimizes the transfer characteristic of the imaging optical system by an energy minimizing process.

5. An exposure apparatus which exposes a substrate while controlling a position of a movable structure stage in accordance with a position of a mark formed on the substrate held on the substrate stage, said apparatus comprising:
   an imaging optical system which obtains the mark as an input signal and outputs an image of the mark as an output signal;

a transfer characteristic calculation apparatus of claim 1, which calculates a transfer characteristic of said imaging optical system;

a reconstruction unit which reconstructs the input signal based on information of the output signal and the transfer characteristic calculated by said transfer characteristic calculation apparatus; and a detection unit which detects the position of the mark based on the input signal reconstructed by said reconstruction unit.

6. A device manufacturing method comprising steps of:

preparing a substrate on which a latent image pattern is formed; and developing the latent image patter, wherein the preparing step includes steps of:

(i) generating a second signal by converting a first signal obtained by stretching an impulse signal on a space axis into a positive value;

(ii) obtaining an image that is output from the imaging optical system as an output signal when a light intensity distribution is input as the second signal; and (iii) calculating the transfer characteristic of the imaging optical system by convolution of a third signal with a fourth signal that is obtained by canceling a bias component of the output signal obtained by the sensor, the third signal being an impulse signal upon convolution with the first signal.

7. A transfer characteristic calculation method of calculating a transfer characteristic of an imaging optical system, said method comprising steps of:

generating a second signal by converting a first signal obtained by stretching an impulse signal on a space axis into a positive value;

obtaining an image that is output from the imaging optical system as an output signal when a light intensity distribution is input as the second signal; and calculating the transfer characteristic of the imaging optical system by convolution of a third signal with a fourth signal that is obtained by canceling a bias component of the output signal obtained by the sensor, the third signal being an impulse signal upon convolution with the first signal.

* * * * *